United States Patent
Nice et al.

(10) Patent No.: US 9,898,773 B2
(45) Date of Patent: Feb. 20, 2018

(54) MULTILINGUAL CONTENT BASED RECOMMENDATION SYSTEM

(71) Applicant: Microsoft Technology Licensing, LLC, Redmond, WA (US)

(72) Inventors: Nir Nice, Kfar Veradim (IL); Noam Koenigstein, Raanana (IL); Shay Ben-Elazar, Tel Aviv (IL); Shahar Keren, Tel Aviv (IL); Ulrich Paquet, Cambridge (GB); Yehuda Finkelstein, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 604 days.

(21) Appl. No.: 14/546,719

(22) Filed: Nov. 18, 2014

(65) Prior Publication Data

US 2016/0140643 A1    May 19, 2016

(51) Int. Cl.
   *G06F 17/30*    (2006.01)
   *G06F 17/27*    (2006.01)
   *G06Q 30/06*    (2012.01)

(52) U.S. Cl.
   CPC ..... *G06Q 30/0631* (2013.01); *G06F 17/2785* (2013.01); *G06F 17/30616* (2013.01); *G06F 17/30684* (2013.01)

(58) Field of Classification Search
   CPC .......... G06Q 30/0631; G06F 17/30616; G06F 17/2785; G06F 17/30684
   See application file for complete search history.

(56) References Cited

U.S. PATENT DOCUMENTS

| | | |
|---|---|---|
| 8,078,450 B2* | 12/2011 | Anisimovich ...... G06F 17/2755 704/2 |
| 8,224,836 B1 | 7/2012 | Piratla |
| 8,321,357 B2 | 11/2012 | Lapir et al. |
| 8,762,382 B2 | 6/2014 | Harrison et al. |

(Continued)

OTHER PUBLICATIONS

Foltz, The Measurement of Textual Coherence with Latent Semantic Analysis, 1998, pp. 1-32.*

(Continued)

*Primary Examiner* — Albert Phillips, III
(74) *Attorney, Agent, or Firm* — Shook, Hardy & Bacon, LLP

(57) ABSTRACT

Example apparatus and methods access multiple sources of information concerning features for applications, clean the data from the multiple sources, extract features from the cleaned data, selectively weight the sources, data or extracted features and produce a feature vector. The feature vector may then be used in a single language feature space or in a multi-language feature space. Feature spaces may then be used to find similarities between applications to facilitate recommending applications. In one embodiment, different feature spaces may be connected using a graph where nodes represent items and edges represent similarity relationships between items based on related feature spaces. Traversing the graph may allow similarities to be found that might not otherwise be possible. For example, while there may be no direct English to Hebrew similarity relationship, there may be English to French and French to Hebrew relationships that can be followed in the graph.

20 Claims, 10 Drawing Sheets

(56) References Cited

U.S. PATENT DOCUMENTS

| 2008/0167001 | A1 | 7/2008 | Wong |
| 2010/0281025 | A1 | 11/2010 | Tsatsou et al. |
| 2013/0138674 | A1 | 5/2013 | Jeong et al. |
| 2014/0058722 | A1 | 2/2014 | Sun et al. |
| 2015/0135059 | A1* | 5/2015 | Liang ............... G06F 17/2247 715/234 |
| 2015/0199333 | A1* | 7/2015 | Nekhay ............... G06F 17/278 704/9 |

OTHER PUBLICATIONS

Takasu, Atsuhiro, "Cross-Lingual Keyword Recommendation Using Latent Topics", In Proceedings of the 1st International Workshop on Information Heterogeneity and Fusion in Recommender Systems, Sep. 26, 2010, pp. 52-56.

Lops, et al., "MARS: A Multilanguage Recommender System", In Proceedings of the 1st International Workshop on Information Heterogeneity and Fusion in Recommender Systems, Sep. 26, 2010, 8 pages.

Luberg, et al., "Context-aware and Multilingual Information Extraction for a Tourist Recommender System", In Proceedings of the 11th International Conference on Knowledge Management and Knowledge Technologies, Sep. 7, 2011, 9 pages.

Croft, et al., "Applications of Multilingual Text Retrieval", In Proceedings of the Twenty-Ninth Hawaii International Conference on System Sciences, vol. 5, Jan. 3, 1996, pp. 98-107.

\* cited by examiner

MULTILINGUAL CONTENT BASED RECOMMENDATION SYSTEM

BACKGROUND

Recommendation systems provide a discovery experience for shoppers and users. There are two major types of conventional recommendation systems: collaborative filtering based systems and content based (CB) systems. Collaborative filtering (CF) depends on actual user events, for example a user consuming (e.g., buying/watching/reading) an item. CF systems may tell a user that "people who saw A also tend to see B and C." Content based systems describe features (e.g., author, actor, genre) of items. Content based systems may also depend on actual user events. For example, content based systems may tell a user that "this movie has features like this other movie you watched." Different techniques may be used to compute item similarities and then to provide recommendations based on the similarities. The quality of a content based similarity recommendation varies directly with the quality of data describing the feature. Since data about features may be available in different languages and different dialects and may have different or even dubious quality, some content based similarity recommendations may have questionable value.

Conventional recommendation systems provide information about matches between users (e.g., shoppers) and items (e.g., books, videos, games) or between items and items based on user interests, preferences, history, item features, or other factors. For example, if a system has data that a user has previously accessed a set of items, then a recommendation system may identify similar items and recommend them to the user based on the data about the user's own actions (e.g., "if you liked this, you might like that"). This may be referred to as a user-to-item recommendation, a U2I reco, or as a "pick". If a system has data that one item has features like another item, then a conventional recommendation system may also provide item-to-item recommendations or "related" recommendations (e.g., "this movie has the same actors and subject matter as this other movie"). These recommendations may be referred to as I2I CB recos. The quality of I2I CB recos depends on the quality of the data associated with the features upon which the recommendation decision is made.

In conventional content based recommendations systems, items that can be recommended or considered for recommendation may include metadata tags. The metadata tags may be manually curated to facilitate categorization and similarity estimation. While conventional content based recommendations systems may have provided interesting and relevant results, sub-optimal recommendations may have been provided for different reasons. For example, in some domains the feature vocabulary (e.g., set of curated metadata tags) may be sparse or insufficient. By way of illustration, an application may be tagged under a first category (e.g., Games-puzzle) but may actually be a "match-3" type of game. This "match-3" type of game may inadvertently get clustered with other puzzle games if the feature vocabulary is too sparse to convey the additional categorization. In another example, manually curated labels may be wrong or may have different significance between a tagger and a user of the tag. By way of illustration, a domain may rely on a manual curation of features by experts. The features may be binary in that they either exist in relation to the item or they do not exist in relation to the item. Conventionally there may be little if any validation of these manually curated tags. An incorrect or inaccurate tag for a feature may produce negative consequences (e.g., reduced quality) for similarity measures that consider the feature. In another example, a domain may have textual representations in several languages. The translations may vary in quality or in point of view for describing the content of an item. By way of illustration, an English language tag may have been produced by a native English speaker and then a French language tag may have been produced by the same native English speaker who incorrectly translates the tag. Thus, a single item may have inconsistent and even incorrect tags which once again may produce sub-optimal or even misleading recommendations. In yet another example, a source of a tag for a feature may be prone to bias, abuse or even fraud by developers, curators, or other tag producers or feature annotators. Once again there may be little if any validation of these biased or fraudulent tags.

SUMMARY

This summary is provided to introduce, in a simplified form, a selection of concepts that are further described below in the Detailed Description. This summary is not intended to identify key features or essential features of the claimed subject matter, nor is it intended to be used to limit the scope of the claimed subject matter.

Example apparatus and methods access multiple sources of information concerning features for items (e.g., applications, books, movies, games), clean the data from the multiple sources, extract features from the cleaned data, selectively weight the sources, data or extracted features, and produce a feature vector suitable for use by a content-based recommendation system. The feature vector may then be used in a single language feature space or in a multi-language feature space. The single language or multiple language feature spaces may then be used to find similarities between applications to facilitate recommending applications. More generally, the vectors and feature spaces may be used to find similarities between items that can be described by features. In one embodiment, different applications may be connected using a graph where nodes represent applications and edges represent similarity relationships that are possible through related feature spaces (e.g., features in a common language). Traversing the graph may allow similarities to be found that might not otherwise be possible. For example, while there may be no direct English to Hebrew similarity relationship between items that could be recommended as being similar, there may be English to French and French to Hebrew relationships that can be followed in the graph to find a feature-based recommendation for the item.

Example apparatus and methods perform a supervised enrichment of the set of available features for application recommendations based on unstructured textual sources in different languages. Scores may be assigned to a content based on correlations between the item and the feature. The correlations may include, for example, Term Frequency-Inverse Document Frequency (TF-IDF) scores, latent semantic indexing coefficients, or other correlations. Theoretically the relevance of features could be determined by factorizing an entire N-gram or W-shingle corpus. However, factorizing an N or W multi-dimensional matrix may be infeasible. Thus, example apparatus and methods may pre-process data (e.g., tags) associated with the multi-dimensional vector space. Preprocessing may include, for example, identifying and merging synonymous dimensions, identifying and disposing of uninformative words, merging tags across languages, or identifying, ordering, or ranking domain specific words. In one embodiment, different textual sources may be reweighted to produce a model that encapsulates the content of an application. The model that results from the preprocessing facilitates detecting and filtering out outliers, abusive content, and other undesirable tags.

In one example, an apparatus performs natural language processing to extract keywords from textual descriptions of items (e.g., applications, movies) for which a recommendation system may provide a recommendation. The textual descriptions may be, for example, descriptions, tags, categories, ratings, or other structured data pertaining to the item. The keywords may be, for example, manually curated metadata tags. The extracted keywords may be used by a content based recommendation system to identify similarities between items. The apparatus may weigh the contribution of keywords from an item based on the textual source or process that was used to extract the keywords. The apparatus may integrate keywords for an item where the keywords are associated with different locales, languages, or demographics. For example, a younger demographic may describe an item as a "droid" while an older demographic may refer to the same item as a "smartphone." Similarly, a first locale may refer to the item as a telephone while another locale may refer to the item as a phone or telly. Additionally, a phone may be referred to as a phone in English, a teléfono in Spanish, and a telephone in French. The keywords that have been extracted, weighted, integrated, and otherwise preprocessed may then be used to detect fraud or abuse and used in feature spaces for finding similarities based on features.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
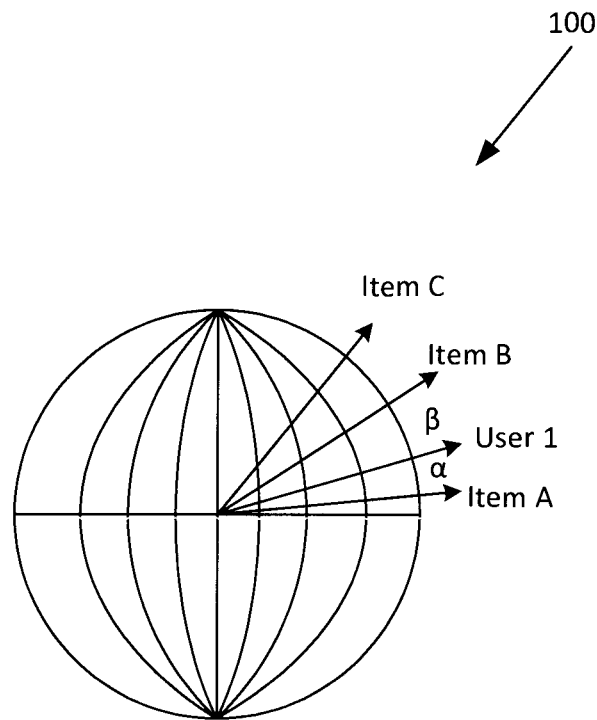
FIG. 1 illustrates an example space.

Example apparatus and methods provide improved tagging for a content based recommendation system. In the context of item-to-item (i2i) recommendations, some domains may benefit from recommending alternative items rather than complementary items. Identifying good alternative items may include estimating similarities between items by percolating similarity information from a pairwise scoring function to $n^{th}$ degree transitive relationships. Estimating similarities by pairwise scoring may be referred to as matrix factorization. Matrix factorization uncovers dominant signals in the data that is factorized and may nullify some of the noise in the data. This may increase the signal to noise ratio in the data.

Conventional matrix factorization models map users and items to a joint latent factor space and model user-item interactions as inner products in the joint latent factor space. An item may be associated with an item vector whose elements measure the extent to which the item possesses some factors. Thus, conventional systems tend to rely on item similarity in the latent space to identify which items in a user's history are related to a recommended item. Similarly, a user may be associated with a user vector whose elements measure the extent of interest the user has in items that are high in corresponding factors. The dot product of the vectors may describe the interaction between the user and item and may be used to determine whether to make a recommendation to a user. More specifically, every user i may be assigned a vector $u_i$ in a latent space, and every item j may also be assigned a vector $v_j$ in the latent space. The dot product $u_i \cdot v_j$ represents the score between the user i and the item j. The score represents the strength of the relationship between the user i and the item j and may be used to make a recommendation (e.g., recommend item with highest score). After all the items j have been scored, the highest scoring items may be selected and recommended.

Estimating item similarity may involve describing items as vectors of features and defining a similarity scoring metric that computes how well two feature vectors correlate. Items with good similarities may then be used as candidates for relatedness-based picks. One type of recommendation system relies on rich feature vectors to describe items. The quality of scoring functions and resulting models will be a function of the quality of the features that describe items. Domains (e.g., sets of feature vectors associated with items) that have few features per item may not be able to produce distinctive patterns that would facilitate pinpoint recommendation. Thus, only broad recommendations may be produced when the features are described with an insufficient or sparse sets of tags. For example, in a domain of computer applications, applications that are only labeled 'Utility' will not be able to be distinguished as flashlight applications or currency converters or other utilities. Example apparatus and methods improve the descriptions of the features and thus improve the ability to provide better recommendations. Example apparatus and methods process available textual data descriptions and metadata (e.g., tags) associated with items in a domain. The textual data description or metadata may be available in a semi-structured manner and in natural form. For some domains, textual data description or metadata may exist in several languages. The textual descriptions or metadata may be disjoint or complementary in content.

Example apparatus and methods integrate textual data for an item from the various sources and languages from which the data is available. The data is then mined for informative features. The informative features may have an association score established for them. The association score may measure the contribution of an informative feature. Example apparatus and methods may then output sparse vectors that are used to estimate item similarities. In one embodiment, the sparse vectors may be organized into single language feature spaces. In another embodiment, the sparse vectors may be organized into multi-language feature spaces. Translating and collapsing features may facilitate producing a single multi-lingual feature space. One example method applies multiple treatments to texts to produce lists of features. As the texts are processed, a record of the source of each feature is maintained. A graph may be produced to facilitate finding similarities using the single language feature spaces. In one embodiment, the graph may be represented using a latent vector space model. The graph or latent vector space model provide a distance function between items and items or between items and users.

FIG. 1 illustrates a space 100 where the distance between items is defined. For example, the distance between a first vector associated with a first item (e.g., Item A) and a second vector associated with a first user (e.g., User 1) may be measured by angle α and the distance between the second vector and a third vector associated with a third item (e.g., Item B) can be measured by β. The distance between items may describe, for example, the degree of similarity of the items. While distance is illustrated being measured by angles, other distance measuring approaches may be applied. The space 100 may have been created by performing matrix factorization on a user-to-item usage matrix and thus the distance between a user item and vector item could be found.

Figure 2:
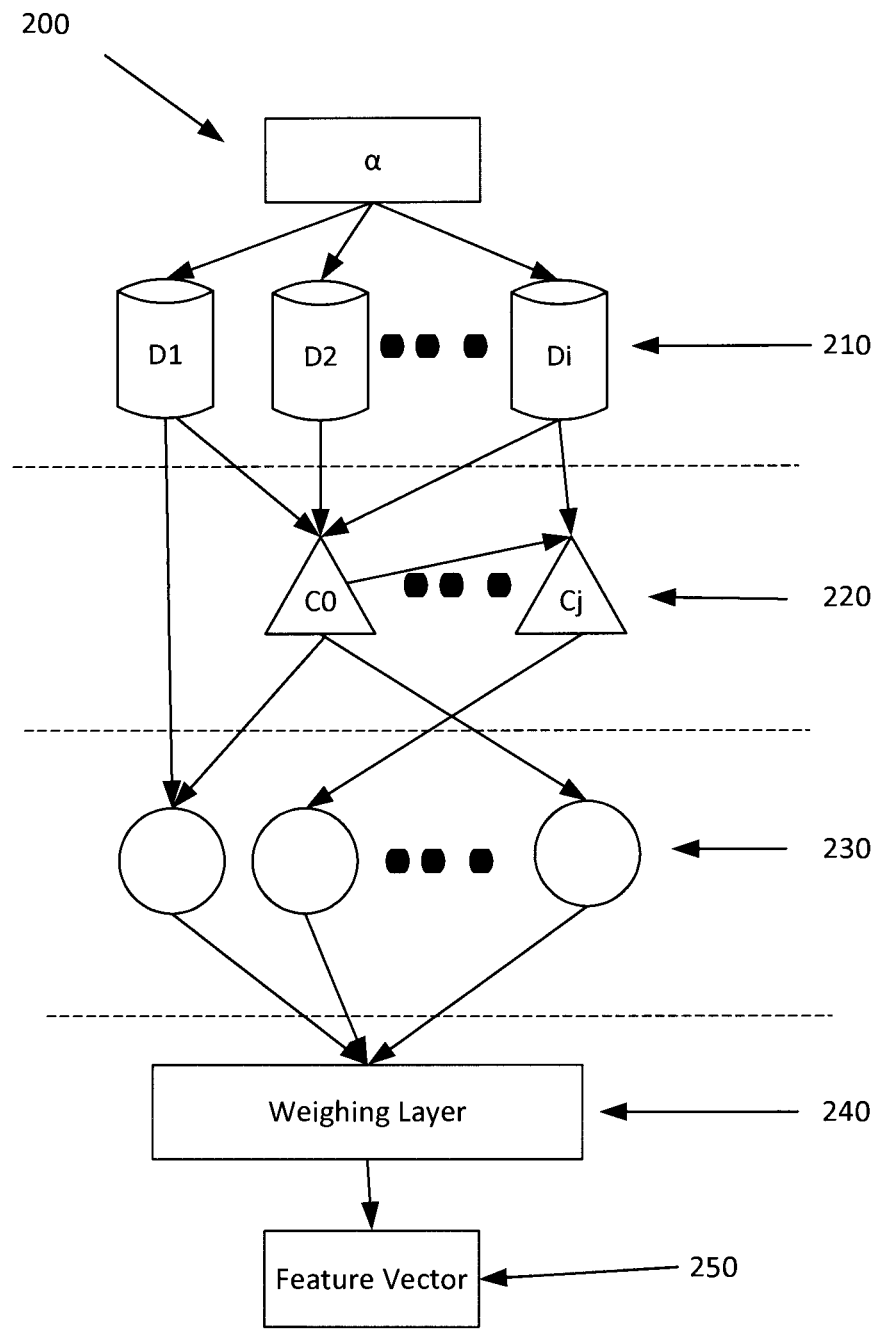
FIG. 2 illustrates an example cleaning, extraction, and weighing process.

FIG. 2 illustrates an example cleaning, extraction, and weighing process that produces a feature vector 250. FIG. 2 is provided in the context of applications that may be available for download or purchase. FIG. 2 shows an application 200 for which multiple data sources 210 store or provide information. The data from the multiple data sources 210 is provided to different cleaning processes 220. The raw or cleaned data may then be provided to multiple feature extraction processes 230. A feature vector 250 is produced by making weighted integrations of the features produced by the feature extraction processes 230. The weights used in the weighted integration are provided or applied at the weighing layer 240.

Applications may be written in different locations (e.g., countries, regions) by different programmers who speak different languages (e.g., English, French, Chinese, Japanese, Hebrew, Hindi) and who write their applications in different languages (e.g., C, C++, C#, Java, SNOBOL, LISP, Fortran, COBOL) and that use different colloquialisms. While examples concerning applications are provided, similar issues may exist in other domains (e.g., movies, books, merchandise). Applications may be described (e.g., titled, abstracted) by the programmers in their native languages using certain conventions common to different groups of programmers. The programmers may also attempt to provide descriptions in other languages. For example, a French speaking programmer in Quebec may provide a Quebecois language title and an English language subtitle or description. Applications may also be described (e.g., reviewed) by users in their native languages. Even within a single language (e.g., English), the language in which the programmer writes the application may affect how the application is described. For example, Kernighan and Ritchie devotees may describe items using a humpback approach (e.g., ConcatenatedWordsGetCapitalized) while Kochan devotees may separate words by spaces or underscores (e.g., words_separated_by_underscores). Similarly, older programmers may describe an application using language familiar to older people while younger programmers may describe an application using language familiar to younger people. Thus, titles and other descriptions may be written in different languages using different styles. Contemporary content based recommendation systems may not account for these differences and thus may produce sub-optimal recommendations. Example apparatus and methods facilitate improving content based recommendations in a multilingual environment by accessing feature content from multiple sources, cleaning the data, extracting features, and producing superior feature vectors from the cleaned data.

Example apparatus and methods may employ two approaches. In a first approach, all content is factorized into a single feature space. In a second approach, content for a single language or domain is factorized into a feature space for that language and then a graph is constructed that facilitates relating applications whose features are in one feature space to applications whose features are in another feature space. In one embodiment, the graph may be represented using a latent vector space model. The graph or latent vector space model provide a distance function between items and items or between items and users.

An example item (e.g., application 200) may have data available from a number of data sources 210. FIG. 2 illustrates an application a 200, for which there are i textual data sources 210, $D_1, \ldots, D_i$. The data sources 210 may include, for example, an English description written by the provider of the item 200, a review of the item 200 written by a user in Spanish, a name or title of the item 200 written in Kochan-style C, a name or title of the item 200 written in K&R-style C, a name or title of the item 200 written in Java-style, or other sources. Example methods and apparatus may acquire and process information from the different available data sources 210 to create a single vector 250 that describes the application 200 in a single feature space. Example methods and apparatus may also acquire and process information from the different available data sources 210 to create language specific vectors that describe the application 200 in different feature spaces.

Data from the different sources 210 may be subjected to different independent or interdependent cleaning procedures 220 ($C_0, \ldots, C_j$). One example cleaning process may remove non-letter Unicode symbols and punctuation. Another cleaning process may lower the case of upper case letters. Another cleaning process may remove banned words (e.g., profanity, slurs). Some cleaning procedures may be specific to the data source. For example, computer application titles may tend to have English words in camel case form (e.g. "WonderCamera"). Rather than treat the concatenated word as a single word, a cleaning process may separate the words based on the capitalization scheme to reveal the informative feature "Camera". The feature may then be cleaned to produce an all lower case feature "camera." Another source specific cleaning process may filter out language specific stop-words. Another source specific cleaning process may filter out synonyms or resolve synonyms to a common word. In one embodiment, easily translatable words may be "cleaned" by being translated to one or more languages (e.g., English, French). For a single feature space embodiment, only the target language version of the feature may be kept. For an embodiment that has separate feature spaces for separate languages, the original version and the translated versions may be kept.

Data from different data sources 210 may be processed using a different sequence or sequences of cleaning based, for example, on the type of text in the data source. Once the data has been cleaned, then the data may be processed by one or more feature extraction processes 230. Data from different data sources 210 may be directed to different feature extraction processes 230. The feature extraction processes 230 may include, for example, a tokenization process, an n-gram extraction process, a proper noun detection process, a lemmatization process, a stemming process, or other process. A single path in the logical flow for a data source ending at the weighing layer 240 may be referred to as a treatment. A list of example source specific treatments is provided in Table 1.

TABLE 1

| Source Name | Feature Extraction Process | Analysis Description |
|---|---|---|
| Title | Tokenized using case | "JamesBlunt App" → "James", "Blunt", "App" |
| Description | Language identification Part-of-speech tagging 2/3-gram extraction Tokenize and stem | E.g. a Chinese app where the confidence of the predictor is >0.7 would get the feature "lang_ch" Extracts proper nouns, and named entities e.g. "San Tropez" Links pairs/triplicates of words, e.g. "Angry Birds". Filtering stop-words, non-english words. Result e.g. "Tables" → "table" |
| Genre | Replicated | Saved as genre, subgenre, and genre-subgenre |
| Categories | Kept as-is | |
| Keywords | Kept as-is | |

The output of a treatment is a vector 250 of textual features. The textual features may be, for example, tokens. Example textual features include single words, types of nouns (e.g., proper noun, common noun), n-grams, short phrases, symbols, acronyms, abbreviations, or other features that may be tokenized. A feature may be associated with importance weights. The weights may be proportional to the occurrences of a feature in the data source. For example, if a feature appears more frequently, then the feature will have a higher weight. Example weighting schemes include the TF-IDF weighting scheme. Translation may also be applied at the feature extraction stage. Once again, features that are extracted may be translated to one or more target languages. In one embodiment, the original feature may be retained when multiple language specific feature spaces are created or may be discarded when a single language feature space is created.

In one embodiment, weights may be normalized by the total popularity of the token in all items. Words that are common to many items (e.g., applications, movies, books) will have smaller weights than words that are very distinctive to a small set of items. Put another way, words that describe many items will be considered less important than words that describe only a small number of items. Consider all the computer applications in the world. The words "utility" and "game" each describe an enormous number of applications. Similarly the words "Windows" and "UNIX" also describe an enormous number of applications. Using words that describe an enormous number of applications may help partition the universe of applications into smaller subsets, but the smaller subsets may still be unmanageable for identifying a desired application in a content based similarity approach. However, words like the name of the developer (e.g., Susann Brady), the company for which the application was written (e.g., ProtImage) and a pinpoint genre (e.g., skin cancer imaging) for the application may produce much smaller subsets that produce much more informative similarity measurements. Thus, ubiquitous features like "Windows" may be weighted to help partition a space in an initial portion of a content based similarity calculation but weighted to be inconsequential in a later stage of the similarity calculation.

Different treatments for the same item may produce a different list of weighted tokens. Different textual data sources for the same item may generate treatments that have shared tokens but with different weights according to the data source and the treatment traversed. Processing at the weighing layer 240 may involve merging together weights of different treatments to form a single unified weighted vector for an item. Some textual sources may be treated as being more important than others. For example, a treatment that is based on title text may be treated as more important than a review by an anonymous user. Thus, merging the weights from different treatments may include multiplying a treatment with a treatment weight that encodes the relative importance of the treatment. Processing performed at the weighing layer 240 may also include multiplying feature weights by a list of preferred or known words, where the list identifies words for which a prior belief about the importance of some words is encoded. In one embodiment, a member of the list of preferred words may have its own multiplier. The list of preferred words may provide additional weight or importance to special words that are identified as being more informative concerning the role of the item.

A feature $f$ in the resulting feature vector 250 for item a 200 will be scored ($a[f]$) based on a weighted sum of the treatment specific scores for $f$. Denote by $SCORE_T[f]$ the score of the feature $f$ in treatment T. A "treatment" is the path for a feature from acquisition from a data source through cleaning through feature extraction through weighting and on to vector production. In one embodiment, the final score $a[f]$ is a linear combination of $SCORE_T[f]$ weighted by the treatment weights $W_T[f]$ and multiplied by list of preferred words weight for that feature, $L[f]$ ($L[f]=1$ if there is none) as follows:

$$a[f]=L[f]\cdot\Sum_{T/f \in T} W_T[f]\cdot SCORE_T[f] \quad [1]$$

In one embodiment, weights may be tuned manually. In another embodiment, weights may be learned as hyperparameters with various supervised machine learning techniques given a ground truth set. In another embodiment, weights may be tuned using large scale online experiments. Tuning may occur individually for data sources in different languages and therefore tuning may produce a scored sparse vector representation per language per item (e.g., application). The scored sparse vector representation per language per item may be used to produce the language specific feature spaces that may be connected using the graph approach. The scored sparse vector representation per language per item may also be used to aggregate features into a single language feature space. The single language feature space may facilitate comparing two items (e.g. $A_1$, $A_2$) for content similarity. Results may be aggregated across shared language comparisons (e.g., English features, French features) with aggregation function $f$.

Figure 3:
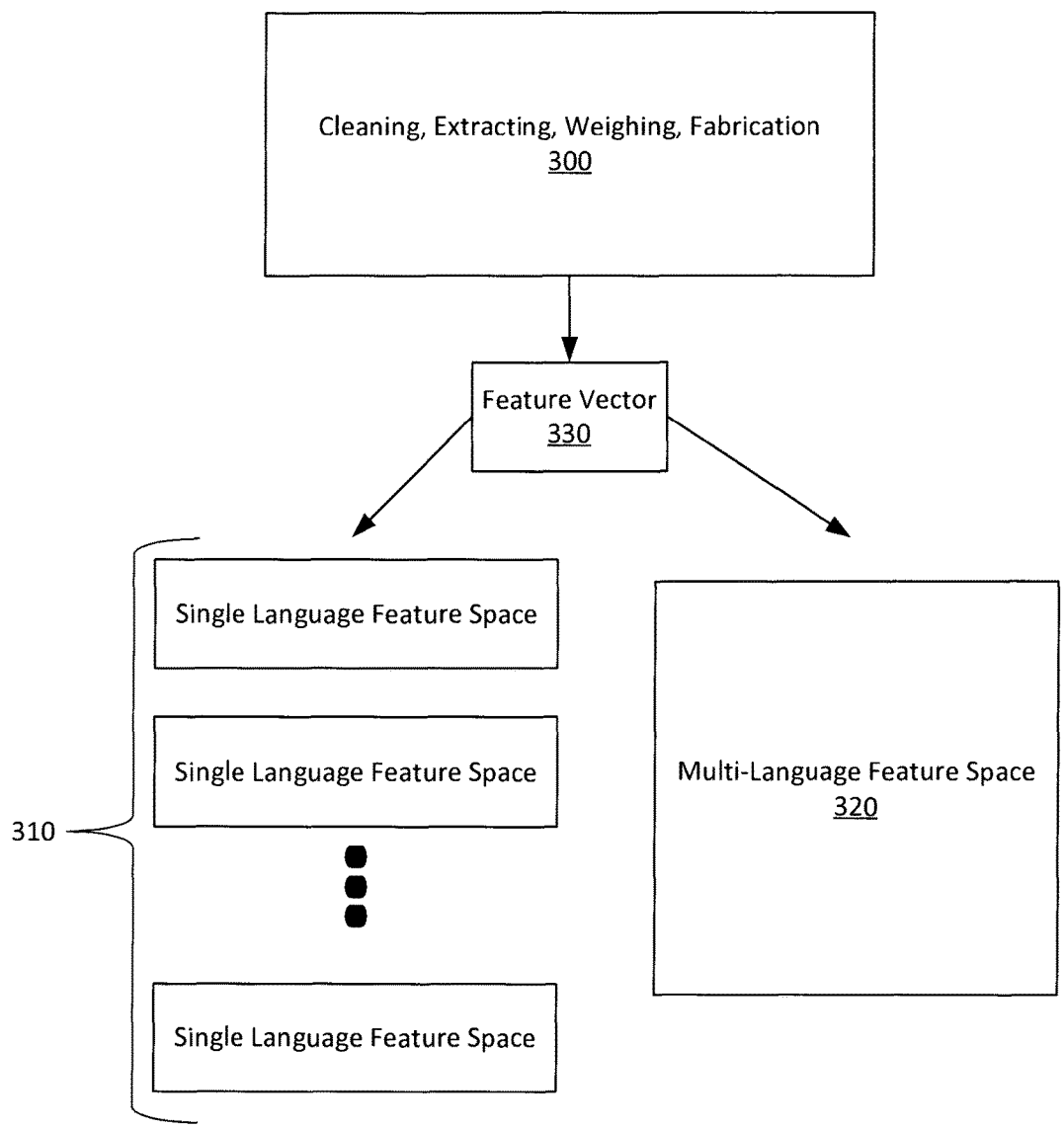
FIG. 3 illustrates an example cleaning, extraction, and weighing process.

FIG. 3 illustrates a plurality 310 of single language feature spaces being created and a multi-language feature space 320 being created. Both the plurality 310 of single language feature spaces and the multi-language feature space 320 may be produced from feature vectors 330 produced by an example cleaning, extracting, weighting, fabrication process 300. Process 300 may be, for example, a process like that described in connection with FIG. 2.

Figure 4:
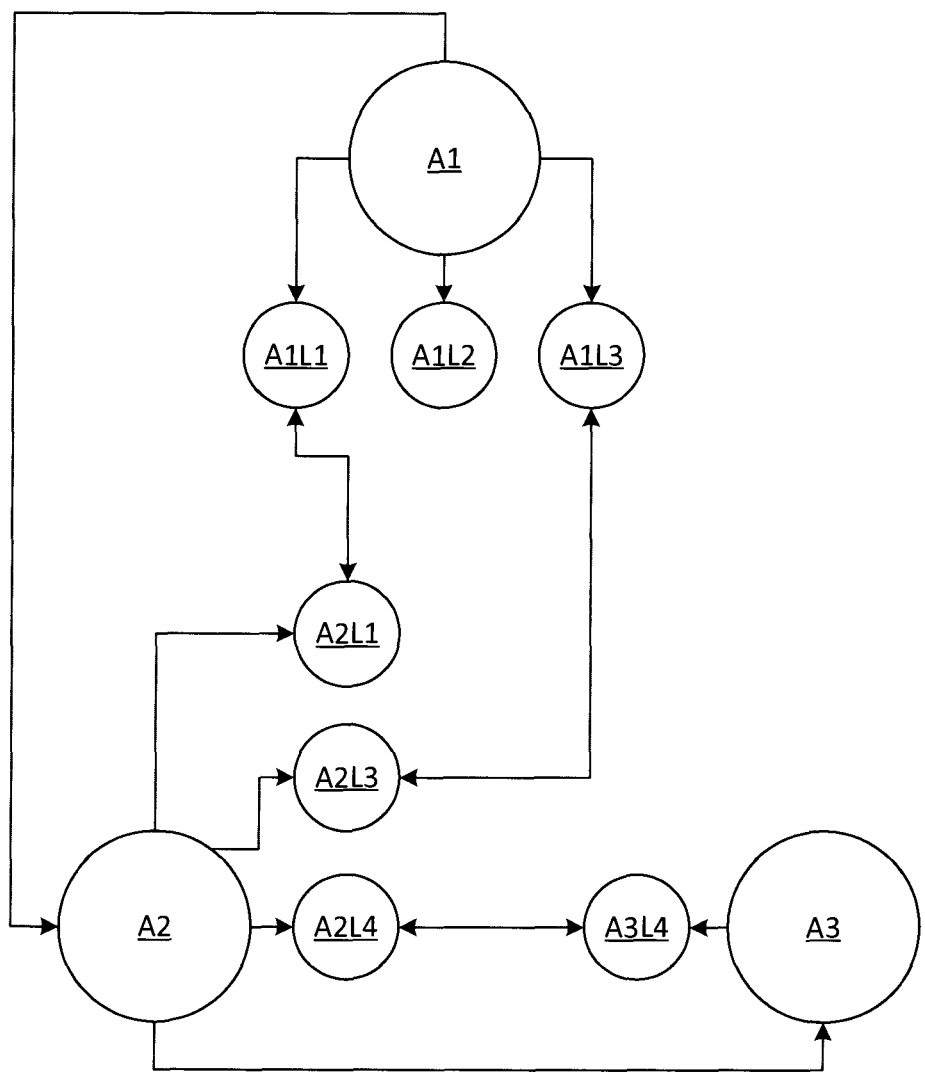
FIG. 4 illustrates an example graph used in an example multilingual feature comparison.

FIG. 4 illustrates one example use of a graph that connects nodes having vectors in feature spaces. In the graph, a node represents an application and an edge represents a similarity score between applications. An edge between two nodes indicates that information (e.g., a feature space in a shared language) for comparing the applications is available. For example, the edges between application A1 and application A2 indicate that a similarity between the two applications can be computed for features in a first language L1 (e.g., English) and that a similarity can be computed for features in a second language L2 (e.g., French). The feature space for application A1 in language L1 is represented A1L1. The feature space for application A1 in language L2 is represented A1L2. The feature space for application A1 in language L3 is represented A1L3. The feature space for application A2 in language L1 is represented A2L1. The feature space for application A2 in language L3 is represented A2L3. The feature space for application A2 in language L4 is represented A2L4. The feature space for application A3 in language L4 is represented A3L4.

The similarity between application A1 and application A2 using language L1 may be described as Sim(A1L1, A2L1). Similarly, the similarity between application A1 and application A2 using language L3 may be described as, Sim(A1L3,A2L3). An overall multi-lingual similarity for application A1 and application A2 may be a function of the two single language similarities. For example, the similarity may be computed according to:

$$Sim(A1,A2)=f(sim(Sim(A1L1,A2L1),Sim(A1L3,A2L3)))$$

The edge between application A2 and application A3 indicates that a similarity can be computed for features in the fourth language L4 (e.g., Chinese). While there is no edge from application A1 to application A3, a similarity between these two applications can still be computed because similarities are available from application A1 to application A2 and then from application A2 to application A3.

For the graph approach, a language similarity may be calculated using a similarity function "Sim" (e.g. graph geodesic distance). Next, a similarity score may be normalized to cancel out dependency on the features of the language by translating the score to a percentile in the distribution of scores for that language. In one embodiment, $f$ can be a simple statistic, (e.g., max, min, median, average of different language similarity scores). In another embodiment, $f$ may be more complex (e.g., weighted average). In one embodiment, the weights may be learned using machine learning techniques based on a ground truth set.

At different points in the processing, example apparatus and methods may perform outlier detection. Outlier detection may be performed using different processes that detect different abusive patterns. Usage patterns may be integrated into the processing to help identify items having highly similar textual patterns that may piggyback on popular items. Popular items upon which other items may piggyback may be identified as "hubs" or "bridges" in an item application similarity graph. Item providers (e.g., application developers, authors, actors) that have multiple items (e.g., applications, books, movies) with highly similar features may be identified and items associated with those providers may have their related scores penalized accordingly.

Once pairwise similarity scores for item pairs that share features in the same language have been established, the matrix can be factorized. The factorization completes missing pairwise similarities and produces a model that captures item similarities for "connected components" in the item similarity graph.

Figure 5:
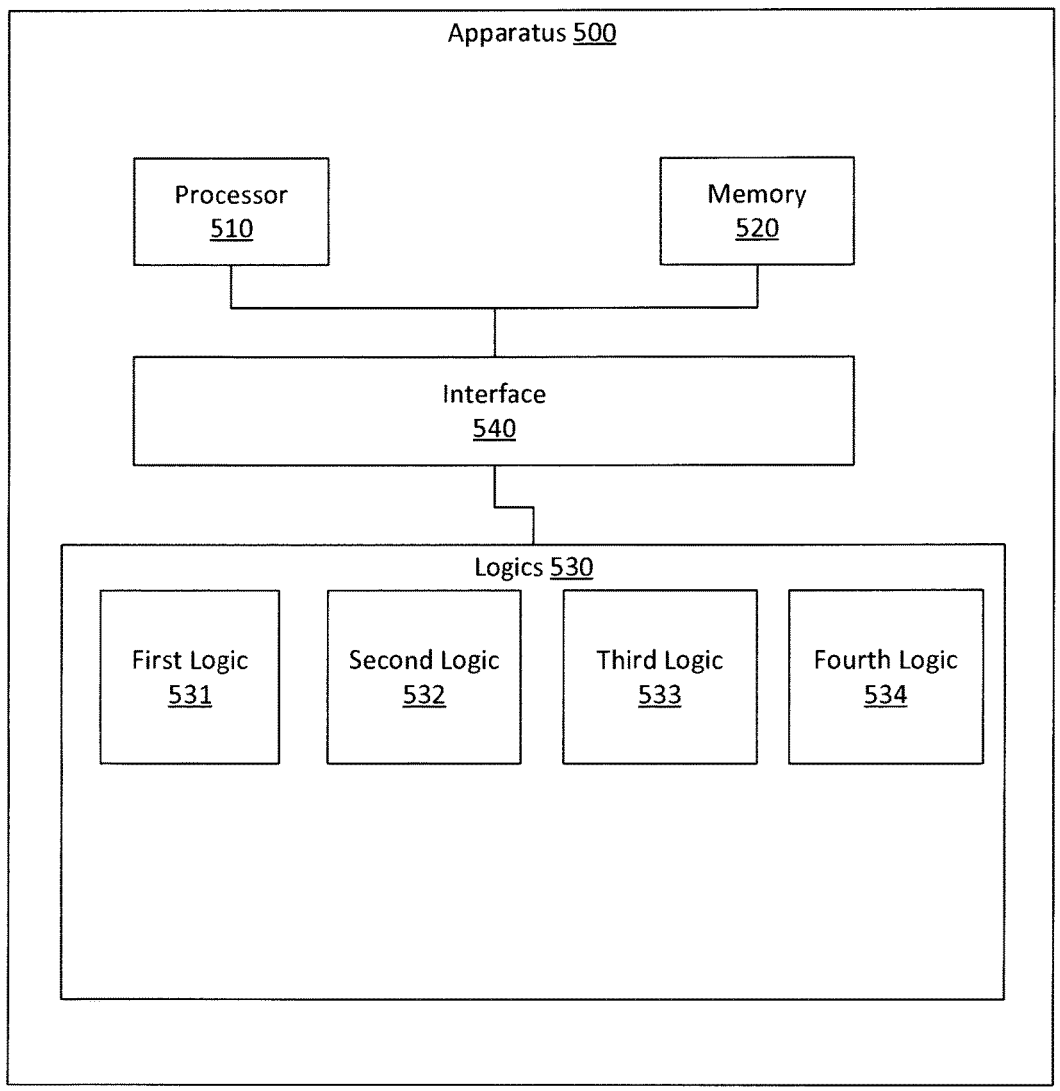
FIG. 5 illustrates an example apparatus associated with a multilingual content based recommendation system.

FIG. 5 illustrates an apparatus 500 that improves features in a multilingual content based recommendation system. Apparatus 500 may include a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated circuit (ASIC), a processor in a mobile device, a system-on-a-chip, a dual or quad processor, or other computer hardware. The memory 520 may store data concerning weights to be applied to data sources, weights to be applied to different features, cleaning instructions for data, feature extraction instructions, feature vector production data, and graph production data. The memory 520 may store data associated with features to be processed by a multilingual content based recommendation system.

In one embodiment, the apparatus 500 may be a general purpose computer that has been transformed into a special purpose computer through the inclusion of the set 530 of logics. Apparatus 500 may interact with other apparatus, processes, and services through, for example, a computer network. Apparatus 500 may be, for example, a computer, a laptop computer, a tablet computer, a personal electronic device, a smart phone, a system-on-a-chip (SoC), or other device that can access and process data.

In one embodiment, the functionality associated with the set of logics 530 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs).

The set 530 of logics may facilitate improving a multilingual content based recommendation system. The set 530 of logics may treat data from which feature vectors are produced for use by the multilingual content based recommendation system. The set 530 of logics may include a first logic 531 that cleans electronic data from one or more sources to produce cleaned data. The electronic data may represent unstructured text in two or more languages. The unstructured text may describe titles, reviews, abstracts or other written data that describes computer applications, video games, books, movies or other items available in an electronic marketplace.

In one embodiment, the first logic 531 applies different cleaning processes to different members of the sources of electronic data. The different cleaning processes may be applied individually or serially in different combinations. The different cleaning processes may, for example, change capitalization in an item in the electronic data, separate concatenated words in an item in the electronic data, merge synonyms in an item in the electronic data, remove non-Unicode symbols in an item in the electronic data, remove banned words in an item in the electronic data, remove uninformative words in an item in the electronic data, translate words in an item in the electronic data, or perform other actions.

The set 530 of logics may also include a second logic 532 that extracts one or more features from the cleaned data. In one embodiment, the second logic 532 extracts features from the cleaned data. The features may be extracted using, for example, tokenization, n-gram extraction, proper noun detection, lemmatization, stemming, or other extraction processes. In one embodiment, the second logic 532 removes outlying features from the electronic data.

The set 530 of logics may also include a third logic 533 that determines weights for the one or more sources, for the cleaned data, or for the one or more features. In one embodiment, the third logic 533 determines weights for the cleaned data. The weights may be determined based, at least in part, on a source of a piece of electronic data from which the cleaned data was produced, on a type of a piece of electronic data from which the cleaned data was produced, on a cleaning process applied to a piece of electronic data from which the cleaned data was produced, or on another attribute. The third logic 533 may also determine weights for features based, at least in part, on a frequency of a feature in the single language feature space or in the multiple language feature space, or on a feature type.

The set 530 of logics may also include a fourth logic 534 that produces a feature vector from features. In one embodiment, the fourth logic 534 produces the feature vector using term frequency-inverse document frequency processing or using latent semantic indexing. A feature vector may include a single word, a type of noun, an n-gram, a phrase, a symbol, an acronym, an abbreviation, or another element. In one embodiment, the fourth logic 534 scores a feature $f$ in the feature vector for an item based on a weighted sum of treatment specific scores for $f$. For example, the fourth logic 534 may score the feature $f$ in the feature vector for an item a according to:

$$a[f] = L[f] \cdot \Sigma_{T/f \Sigma T} W_T[f] \cdot \text{SCORE}_T[f]$$

where:
$\text{SCORE}_T[f]$ is the score of the feature $f$ in treatment T,
$W_T[f]$ are treatment weights, and
$L[f]$ are preferred words weight for the feature $f$.

Figure 6:
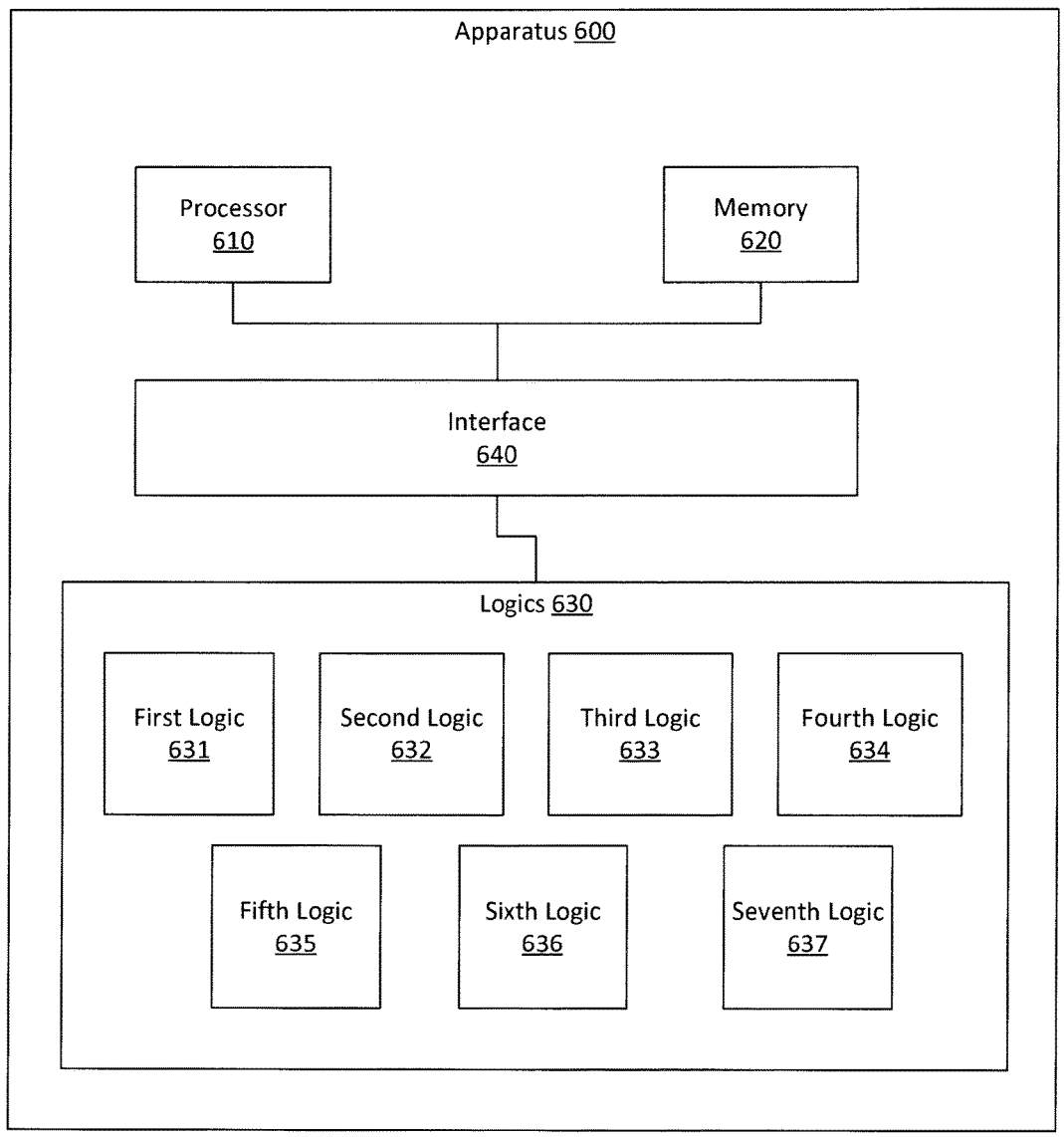
FIG. 6 illustrates an example apparatus associated with a multilingual content based recommendation system.

FIG. 6 illustrates an apparatus 600 that is similar to apparatus 500 (FIG. 5). For example, apparatus 600 includes a processor 610, a memory 620, a set of logics 630 that correspond to the set of logics 530 (FIG. 5) and an interface 640. However, apparatus 600 includes additional logics.

Apparatus 600 includes a fifth logic 635 that produces feature spaces. The fifth logic 635 may produce a single language feature space from one or more feature vectors produced by the fourth logic 634. The fifth logic 635 may also produce a multiple language feature space from one or more feature vectors produced by the fourth logic 534.

Apparatus 600 also includes a sixth logic 636 that produces a graph associated with two or more single language feature spaces produced by the fifth logic 635. In one embodiment, the graph may be represented using a latent vector space model. The graph or latent vector space model provide a distance function between items and items or between items and users. In the graph, a node represents an item for which the fourth logic 634 produced one or more feature vectors, and an edge represents a similarity relationship between two items for which the fourth logic 634 produced one or more feature vectors. The similarity relationships depend, at least in part, on the single language feature space or the multiple language feature space.

Apparatus 600 also includes a seventh logic 637 that produces a content-based similarity score for a first item and a second item for which there is no single edge between the first item and the second item in the graph. The two items may be, for example, two computer applications available in an application store. The content-based similarity score is produced based, at least in part, on the graph. For example, even though the first item and second item do not share an edge, the similarity score for the first item and the second item may be computed using edges between the first item and one or more additional items and using edges between the one or more additional items and the second item.

Figure 7:
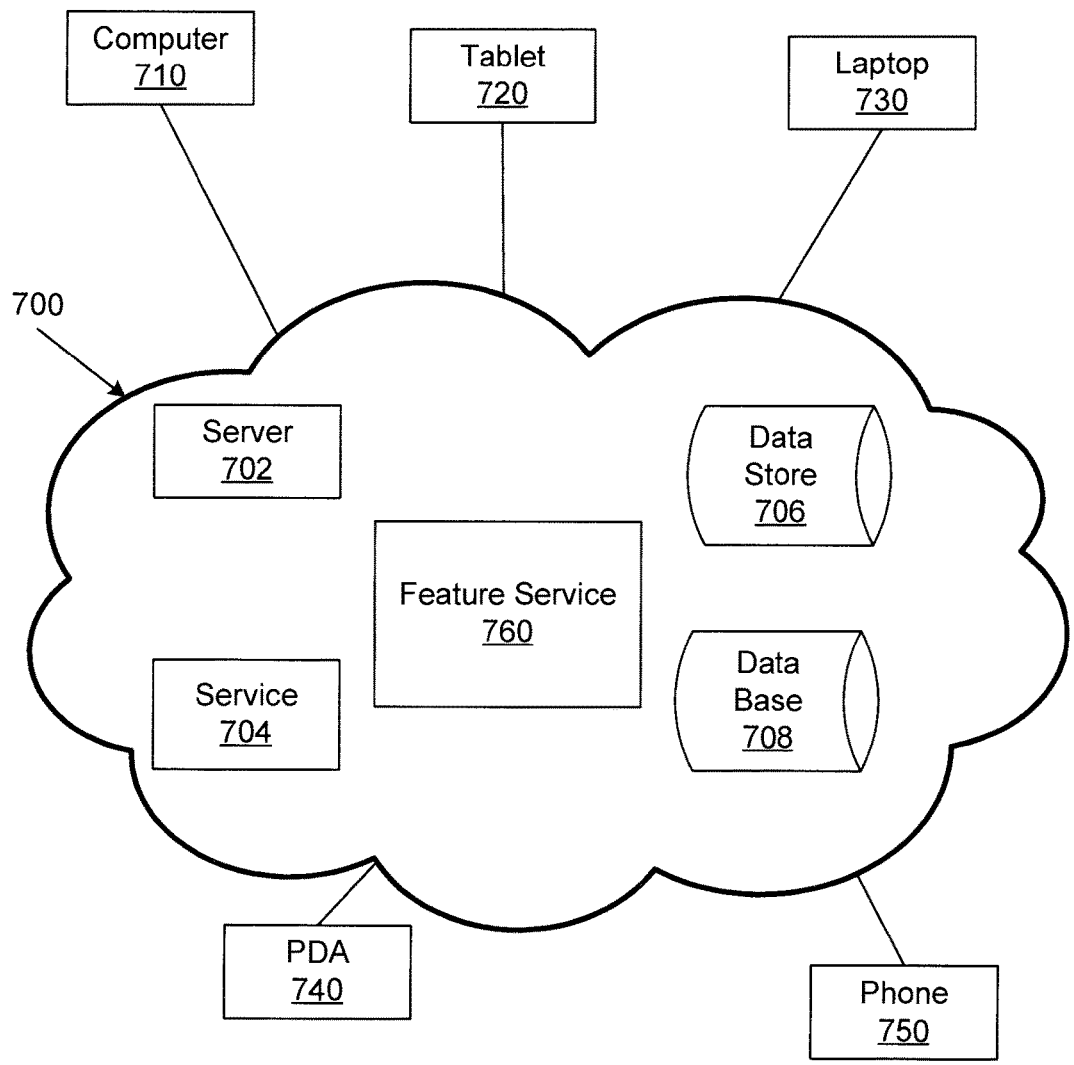
FIG. 7 illustrates an example cloud operating environment in which an example multilingual content based recommendation system may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example multi-lingual feature service 760 residing in the cloud. The multi-lingual feature service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the multi-lingual feature service 760.

FIG. 7 illustrates various devices accessing the multi-lingual feature service 760 in the cloud. The devices include a computer 710, a tablet 720, a laptop computer 730, a personal digital assistant 740, and a mobile device (e.g., cellular phone, satellite phone, wearable computing device) 750. The multi-lingual feature service 760 may produce a recommendation for a user concerning a potential acquisition (e.g., purchase, rental, borrowing). The multi-lingual feature service 760 may produce data from which the recommendation may be made. The multi-lingual feature service 760 may clean data and extract features from which a feature vector can be made.

It is possible that different users at different locations using different devices may access the multi-lingual feature service 760 through different networks or interfaces. In one example, the multi-lingual feature service 760 may be accessed by a mobile device 750. In another example, portions of multi-lingual feature service 760 may reside on a mobile device 750.

Figure 8:
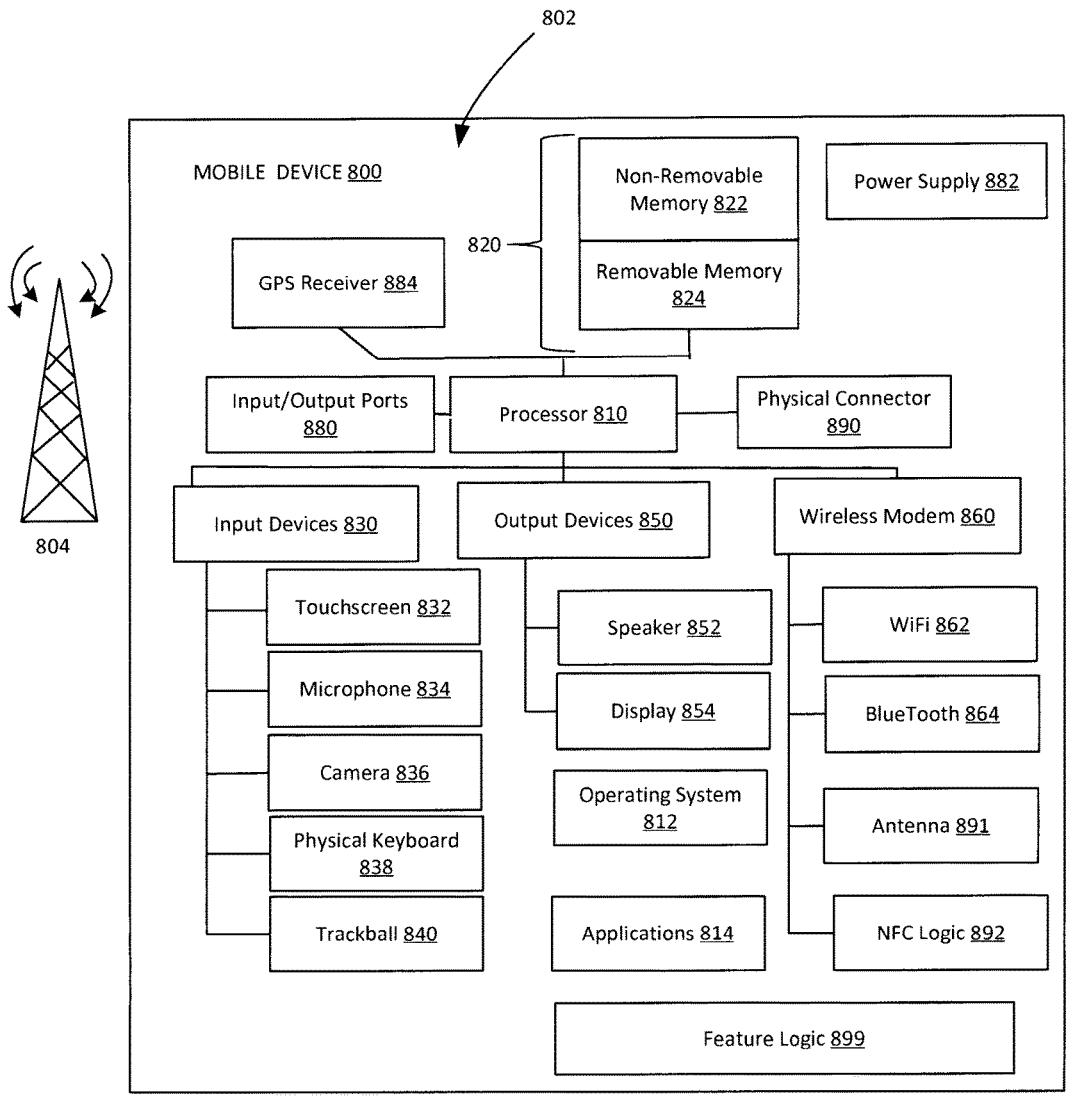
FIG. 8 is a system diagram depicting an exemplary mobile communication device configured to provide an example multilingual content based recommendation system.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite network.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include recommendation applications, matrix factorization applications, mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include user vectors, item vectors, latent space data, recommendations, feature vectors, or other data. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input to a recommendation application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC).

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include feature logic 899 that is configured to provide a functionality for the mobile device 800. For example, feature logic 899 may provide a client for interacting with a service (e.g., service 760, FIG. 7). Portions of the example methods described herein may be performed by feature logic 899. Similarly, feature logic 899 may implement portions of apparatus described herein.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 9:
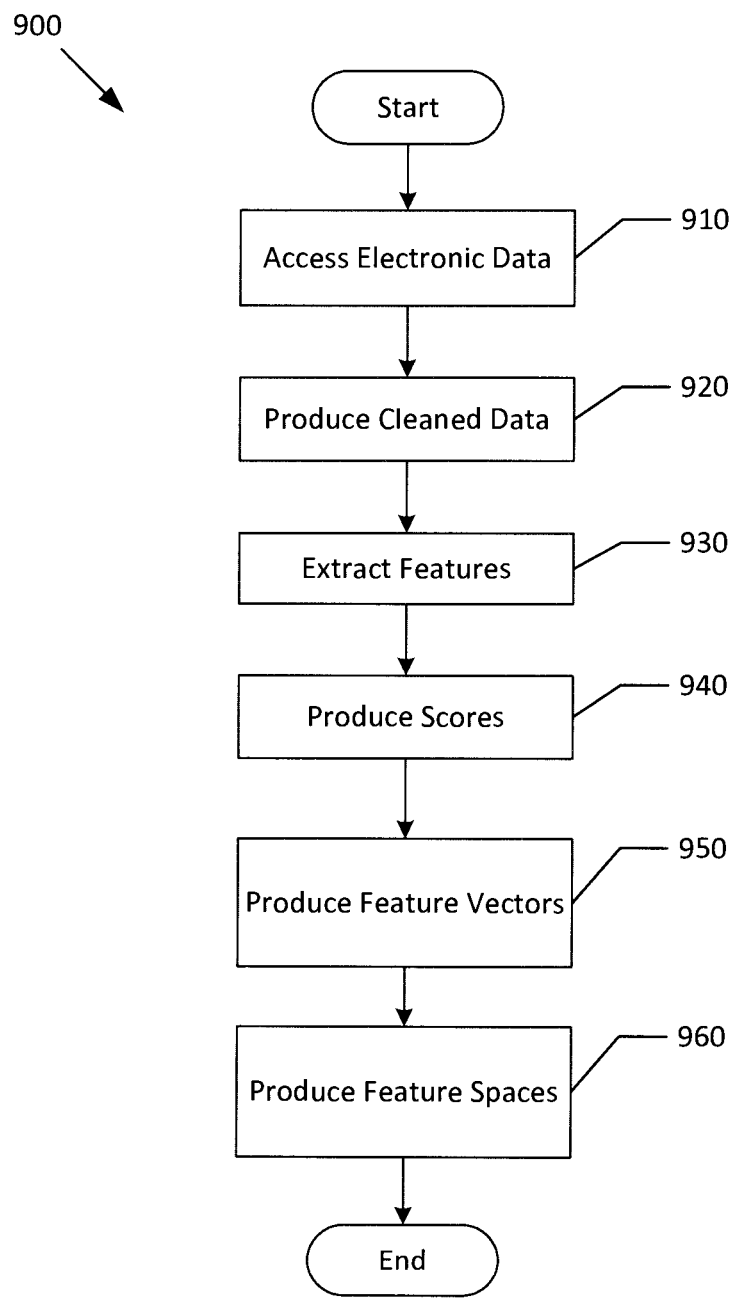
FIG. 9 illustrates an example method associated with an example multilingual content based recommendation system.

FIG. 9 illustrates an example method 900 associated with a multilingual content based recommendation system. Method 900 includes, at 910, accessing electronic data from multiple different sources. The electronic data may represent unstructured text in two or more different languages. The unstructured text may represent titles or descriptions for applications available in an electronic marketplace. The electronic marketplace may be, for example, an "application store".

Method 900 also includes, at 920, cleaning the electronic data to make clean data from which feature vectors can be produced. The clean data will resolve some of the "garbage in garbage out" issues in conventional systems. Cleaning the electronic data may include performing processes independently or interdependently. Different processes or different sequence of processes may be applied to different electronic data based, for example, on the source of the electronic data. Cleaning the data may include changing the capitalization of a word in the electronic data, separating concatenated words in the electronic data, merging synonyms in the electronic data, removing a non-Unicode symbol in the electronic data, removing a banned word in the electronic data, removing an uninformative word in the electronic data, or translating a word in the electronic data.

Method 900 also includes, at 930, extracting one or more features from the cleaned data. The features may be extracted using tokenization, n-gram extraction, proper noun detection, lemmatization, stemming or other extraction approaches. The features that are extracted at 930 may be scored at 940. The scores may be produced based, at least in part, on term frequency-inverse document frequency (TF-IDF) or latent semantic indexing.

Once the features have been extracted at 930 and scored at 940, then method 900 may proceed, at 950, to produce a plurality of feature vectors from the features. The feature vectors may be built based, at least in part, on the scores. A feature vector may include one or more elements including single words, types of nouns, n-grams, short phrases, symbols, acronyms, abbreviations, or other elements. In a model where all languages are collapsed into a single feature space, there may be one feature vector per item. In a model where separate feature spaces are produced for separate languages, there may be one feature vector per item per language.

Method 900 may also include, at 960, producing one or more feature spaces from the plurality of feature vectors. The one or more feature spaces provide data from which a content-based similarity recommendation can be made. The feature spaces may be associated with a single language or with multiple languages.

Figure 10:
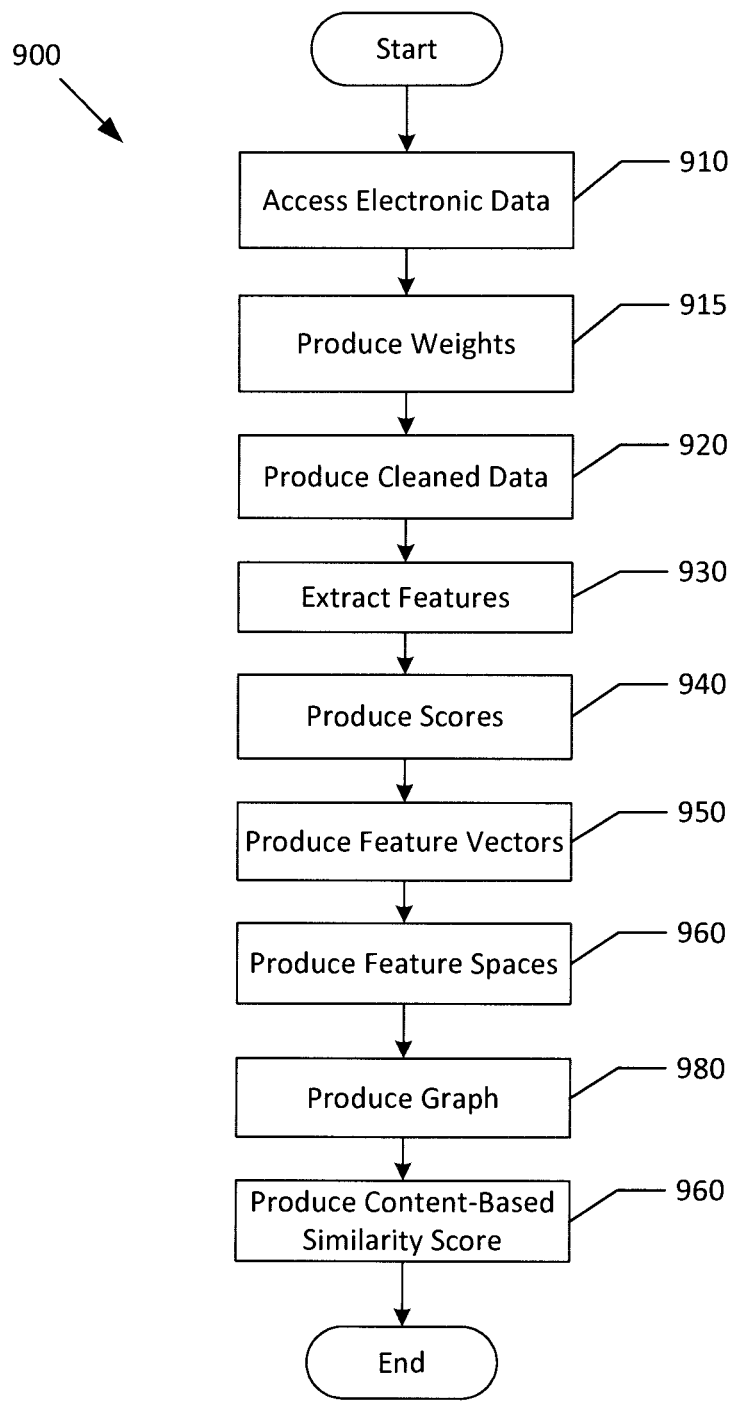
FIG. 10 illustrates an example method associated with an example multilingual content based recommendation system.

FIG. 10 illustrates another embodiment of method 900. This embodiment also includes, at 915, producing weights. Weights may be produced for members of the multiple different data sources, for different types of data, for different types of features, or for different features. When weights are available, producing the feature space at 960 from the plurality of features may depend, at least in part, on the weights.

This embodiment of method 900 also includes, at 970, producing a graph. In one embodiment, the graph may be represented using a latent vector space model. The graph or latent vector space model provide a distance function between items and items or between items and users. In the graph, nodes represents computer applications available in an electronic marketplace and edges represent content-based similarity relationships. See, for example, FIG. 4. The content-based similarity relationships may be based, at least in part, on the one or more feature spaces.

When a graph is available, then method 900 may proceed, at 980, to produce a content-based similarity score for two nodes that are not directly connected by an edge in the graph. Since the two nodes do not share an edge, there is no directly computable similarity score associated with the missing edge. Instead, the content-based similarity score is a function of two or more other content-based similarity scores computed for other pairs of nodes in the graph. See, for example, FIG. 4.

While FIGS. 9 and 10 illustrates various actions occurring in serial, it is to be appreciated that various actions illustrated in FIGS. 9 and 10 could occur substantially in parallel. By way of illustration, a first process could access data sources, a second process could clean data, a third process could extract features, a fourth process could weight data and produce feature vectors, and a fifth process could produce feature spaces. While five processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 900. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

Aspects of Certain Embodiments

In one embodiment, an apparatus includes a processor, a memory, and a set of logics. The apparatus may include a physical interface to connect the processor, the memory, and the set of logics. The memory stores electronic data associated with multilingual content based recommendations. The set of logics produces a feature vector or a feature space having improved characteristics from which improved content based recommendations can be made. The set of logics may facilitate improving a multilingual content based recommendation system. The set of logics may treat data from which feature vectors are produced for use by the multilingual content based recommendation system.

The apparatus cleans electronic data from one or more sources to produce cleaned data. The apparatus may apply different cleaning processes to different members of the sources of electronic data. The different cleaning processes may be applied individually or serially in different combinations. The apparatus may extract features from the cleaned data. The features may be extracted using, for example, tokenization, n-gram extraction, proper noun detection, lemmatization, stemming, or other extraction processes. The apparatus may determine weights for the data sources, for the cleaned data, or for features. The apparatus may produce a feature vector from features. The apparatus may also produces feature spaces including a single language feature space or a multiple language feature space. The feature spaces may be produced from feature vectors produced by the apparatus. The apparatus produces a graph associated with two or more single language feature spaces produced by the apparatus. In the graph, a node represents an item for which the apparatus produced feature vectors and an edge represents a similarity relationship between two items for which the apparatus produced feature vectors. The apparatus produces a content-based similarity score for a first item and a second item for which there is no single edge between the first item and the second item in the graph.

The apparatus produces a technical effect of allowing a computer to produce a more accurate content-based similarity recommendation in a shorter period of time using less computing resources because the feature space is built from superior feature vectors that were built from superior features produced by the cleaning, extracting, and weighting elements. The apparatus also produces a technical effect of reducing the amount of memory required to store data associated with an improved feature space because data that may have contributed little, if anything, to a feature or feature vector will be removed.

In one embodiment, a method includes accessing electronic data from multiple different sources. The electronic data represents unstructured text in two or more different languages. The unstructured text represents titles or descriptions for applications available in an electronic marketplace. The method includes cleaning the electronic data to make clean data from which feature vectors can be produced. Cleaning the electronic data may include performing processes independently or interdependently to change the capitalization of a word in the electronic data, to separate concatenated words in the electronic data, to merge synonyms in the electronic data, to remove a non-Unicode symbol in the electronic data, to remove a banned word in the electronic data, to remove an uninformative word in the electronic data, to translate a word in the electronic data, or to perform another process. The method may include extracting features from the cleaned data using tokenization, n-gram extraction, proper noun detection, lemmatization, stemming, or other extraction processes. The method may include producing weights for members of the multiple different data sources, for different types of data, for different types of features, or for different features. The method may also include producing scores for features based, at least in part, on term frequency-inverse document frequency (TF-IDF), latent semantic indexing, or other extraction processes. The method may include producing a plurality of feature vectors from the features based, at least in part, on the scores. The method may also include producing, from the feature vectors, feature spaces from which a content-based similarity recommendation can be made. The feature spaces may be associated with a single language or with multiple languages. The method includes producing a graph whose nodes represents the applications available in the electronic marketplace and whose edges represent content-based similarity relationships. The method may also include producing a content-based similarity score for two nodes that are not directly connected by an edge in the graph. The content-based similarity score is a function of two or more other content-based similarity scores computed for other pairs of nodes in the graph.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
accessing electronic data from multiple different sources, where the electronic data represents unstructured text in two or more different languages, where the unstructured text represents titles or descriptions for applications, books, movies, or video games available in an electronic marketplace;
extracting one or more features from the data;
producing a plurality of feature vectors from the one or more features where a feature vector comprises one or more elements;
producing from the plurality of feature vectors, one or more feature spaces from which a content-based similarity recommendation can be made;
producing a graph with nodes and edges where the nodes represent computer applications, books, movies, or video games available in an electronic marketplace and the edges represent content-based similarity relationships, where the content-based similarity relationships are based, at least in part, on the one or more feature spaces, wherein the graph is represented using a latent vector space model that provides a distance function between nodes in the graph; and
producing a content-based similarity score for two nodes that are not directly connected by an edge in the graph, where the content-based similarity score is a function of two or more other content-based similarity scores computed for other pairs of nodes in the graph.

2. The method of claim 1, where cleaning the electronic data comprises performing one or more processes independently or interdependently, where the one or more processes change the capitalization of a word in the electronic data, separate concatenated words in the electronic data, merge synonyms in the electronic data, remove a non-Unicode symbol in the electronic data, remove a banned word in the electronic data, remove an uninformative word in the electronic data, or translate a word in the electronic data.

3. The method of claim 1, comprising producing weights for members of the multiple different data sources, for different types of data, for different types of features, or for different features, and
where producing the feature space from the plurality of features depends, at least in part, on the weights.

4. The method of claim 3, the one or more elements being single words, types of nouns, n-grams, short phrases, symbols, acronyms, or abbreviations.

5. The method of claim 4, where the one or more feature spaces are associated with multiple languages.

6. The method of claim 4, cleaning the electronic data to make clean data from which feature vectors can be produced.

7. A computer-readable storage medium storing computer-executable instructions that when executed by a computer control the computer to perform a method, the method comprising:
accessing electronic data from multiple different sources, where the electronic data represents unstructured text in two or more different languages, where the unstructured text represents titles or descriptions for applications available in an electronic marketplace;
cleaning the electronic data to make clean data from which feature vectors can be produced, where cleaning the electronic data comprises performing one or more processes independently or interdependently, where the one or more processes change the capitalization of a word in the electronic data, separate concatenated words in the electronic data, merge synonyms in the electronic data, remove a non-Unicode symbol in the electronic data, remove a banned word in the electronic data, remove an uninformative word in the electronic data, or translate a word in the electronic data;
extracting one or more features from the cleaned data using tokenization, n-gram extraction, proper noun detection, lemmatization, or stemming;
producing weights for members of the multiple different data sources, for different types of data, for different types of features, or for different features;
producing scores for the one or more features based, at least in part, on the weights and on term frequency—inverse document frequency (TF-IDF) or latent semantic indexing;
producing a plurality of feature vectors from the one or more features based, at least in part, on the scores, where a feature vector comprises one or more elements, the one or more elements being single words, types of nouns, n-grams, short phrases, symbols, acronyms, or abbreviations;
producing from the plurality of feature vectors, one or more feature spaces from which a content-based similarity recommendation can be made, where the one or more feature spaces are associated with single languages, where the one or more feature spaces depend, at least in part, on the weights;
producing a graph whose nodes represents the applications available in the electronic marketplace and whose edges represent content-based similarity relationships, where the content-based similarity relationships are based, at least in part, on the one or more feature spaces, and
producing a content-based similarity score for two nodes that are not directly connected by an edge in the graph, where the content-based similarity score is a function of two or more other content-based similarity scores computed for other pairs of nodes in the graph.

8. The media of claim 7, where the graph is represented using a latent vector space model, where the graph or latent vector space model provides a distance function between items and items or between items and users.

9. The media of claim 7, further comprising generating a feature vector of the plurality of feature vectors by:
cleaning electronic data from one or more sources to produce cleaned data;
extracting one or more features from the cleaned data;
determining weights for the one or more sources, for the cleaned data, or for the one or more features, and
producing a feature vector from the one or more features.

10. The media of claim 9, further comprising scoring a feature $f$ in the feature vector for an item a according to:

$$a[f] = L[f] \cdot \Sigma_{T| f \in T} W_T[f] \cdot SCORE_T[f]$$

where:
$SCORE_T[f]$ is the score of the feature $f$ in treatment T,
$W_T[f]$
are treatment weights, and
$L[f]$ are preferred words weight for the feature $f$.

11. A method for content recommendation, comprising:
accessing electronic data from multiple different sources, where the electronic data represents unstructured text in two or more different languages, where the unstructured text represents titles or descriptions for items available in an electronic marketplace;

extracting one or more features from the data;

producing a plurality of feature vectors from the one or more features where a feature vector comprises one or more elements;

producing from the plurality of feature vectors, one or more feature spaces from which a content-based similarity recommendation can be made;

producing a graph with nodes and edges where the nodes represent items available in an electronic marketplace and the edges represent content-based similarity relationships, where the content-based similarity relationships are based, at least in part, on the one or more feature spaces, wherein the graph is represented using a latent vector space model that provides a distance function between nodes in the graph; and producing a content-based similarity score for two nodes that are not directly connected by an edge in the graph, where the content-based similarity score is a function of two or more other content-based similarity scores computed for other pairs of nodes in the graph.

12. The method of claim 11, where cleaning the electronic data comprises performing one or more processes independently or interdependently, where the one or more processes change the capitalization of a word in the electronic data, separate concatenated words in the electronic data, merge synonyms in the electronic data, remove a non-Unicode symbol in the electronic data, remove a banned word in the electronic data, remove an uninformative word in the electronic data, or translate a word in the electronic data.

13. The method of claim 11, comprising producing weights for members of the multiple different data sources, for different types of data, for different types of features, or for different features, and where producing the feature space from the plurality of features depends, at least in part, on the weights.

14. The method of claim 13, wherein the one or more elements are single words, types of nouns, n-grams, short phrases, symbols, acronyms, or abbreviations.

15. The method of claim 11, wherein the one or more feature spaces are associated with multiple languages.

16. The method of claim 11, cleaning the electronic data to make clean data from which feature vectors can be produced.

17. The method of claim 11, wherein in the item is one of a computer application, video game, book, or movie.

18. The method of claim 11, further comprising producing weights for members of the multiple different data sources, for different types of data, for different types of features, or for different features.

19. The method of claim 18, further comprising producing scores for the one or more features based, at least in part, on the weights and on term frequency—inverse document frequency (TF-IDF).

20. The method of claim 18, further comprising producing scores for the one or more features based, at least in part, on the weights and latent semantic indexing.

* * * * *